(12) United States Patent
Singh

(10) Patent No.: US 10,468,145 B2
(45) Date of Patent: Nov. 5, 2019

(54) ENVIRONMENTALLY SEQUESTERED SPENT FUEL POOL

(71) Applicant: Holtec International, Marlton, NJ (US)

(72) Inventor: Krishna P. Singh, Hobe Sound, FL (US)

(73) Assignee: HOLTEC INTERNATIONAL

( * ) Notice: Subject to any disclaimer, the term of this patent is extended or adjusted under 35 U.S.C. 154(b) by 65 days.

(21) Appl. No.: 14/877,217

(22) Filed: Oct. 7, 2015

(65) Prior Publication Data

US 2016/0099085 A1 Apr. 7, 2016

Related U.S. Application Data

(60) Provisional application No. 62/061,089, filed on Oct. 7, 2014.

(51) Int. Cl.
| | | |
|---|---|---|
| *G21C 19/07* | (2006.01) | |
| *G21C 17/00* | (2006.01) | |
| *G21C 13/10* | (2006.01) | |

(52) U.S. Cl.
CPC .......... *G21C 19/07* (2013.01); *G21C 13/10* (2013.01); *G21C 17/002* (2013.01); *Y02E 30/40* (2013.01)

(58) Field of Classification Search
CPC ......... G21C 19/07; G21C 13/10; G21C 17/02
USPC ........................................................ 376/299
See application file for complete search history.

(56) References Cited

U.S. PATENT DOCUMENTS

| | | | | |
|---|---|---|---|---|
| 3,444,725 | A | * | 5/1969 | Chave .................. G01M 3/226 376/256 |
| 3,934,152 | A | | 1/1976 | Alleaume |
| 5,102,615 | A | * | 4/1992 | Grande .................... G21F 5/00 250/506.1 |

(Continued)

FOREIGN PATENT DOCUMENTS

| | | | | |
|---|---|---|---|---|
| DE | 3430180 | | 2/1986 | |
| DE | 3430180 A1 | * | 2/1986 | .......... G21C 13/093 |

(Continued)

OTHER PUBLICATIONS

Corresponding International Search Report and Written Opinion for PCT/US15/54435 dated Jan. 8, 2016.

(Continued)

*Primary Examiner* — Jack W Keith
*Assistant Examiner* — John T Nolan
(74) *Attorney, Agent, or Firm* — The Belles Group, P.C.

(57) ABSTRACT

An environmentally sequestered nuclear spent fuel pool in one embodiment includes sidewalls and a base slab that confine a water impoundment. The pool includes fuel racks containing spent fuel assemblies which heat the water via radioactive decay. A dual liner system enclosing the pool forms an impervious barrier providing redundant provisions for preventing leakage of contaminated pool water into the environment. An interstitial space is formed between the liners which may be maintained at sub-atmospheric pressures by a vacuum pump system that evacuates the space. By maintaining the pressure in the space at a negative pressure with corresponding boiling point less than the temperature of the pool water, any leakage through the inner-most liner into the interstitial space will vaporize and be extracted via the pump for signaling a potential leak in the liner system.

18 Claims, 7 Drawing Sheets

(56) References Cited

U.S. PATENT DOCUMENTS

| | | |
|---|---|---|
| 5,184,504 A | 2/1993 | Spring |
| 6,114,710 A | 9/2000 | Contrepois et al. |
| 8,718,221 B2 | 5/2014 | Singh et al. |
| 2006/0215803 A1 | 9/2006 | Singh |
| 2007/0041789 A1 | 2/2007 | Monroe et al. |
| 2009/0320566 A1* | 12/2009 | Russell .................. G01M 3/32 73/49.2 |
| 2010/0122449 A1 | 5/2010 | Simon |
| 2012/0037632 A1 | 2/2012 | Singh et al. |
| 2014/0192946 A1 | 7/2014 | Singh |
| 2014/0219411 A1 | 8/2014 | Dederer et al. |
| 2015/0211954 A1 | 7/2015 | Agace |

FOREIGN PATENT DOCUMENTS

| | | |
|---|---|---|
| JP | S5757233 | 4/1982 |
| JP | S63250600 | 10/1988 |
| SU | 1408829 | 9/1990 |
| WO | 2014117082 | 7/2014 |
| WO | 2014153570 | 9/2014 |

OTHER PUBLICATIONS

Corresponding Supplementary European Search Report for EP 15849173 dated May 8, 2018.

\* cited by examiner

ENVIRONMENTALLY SEQUESTERED SPENT FUEL POOL

CROSS-REFERENCE TO RELATED APPLICATIONS

The present application claims the benefit of priority to U.S. Provisional Application No. 62/061,089 filed Oct. 7, 2014, the entirety of which is incorporated herein by reference.

BACKGROUND

The present invention generally relates to storage of nuclear fuel assemblies, and more particularly to an improved spent fuel pool for wet storage of such fuel assemblies.

A spent fuel pool (sometimes, two or more) is an integral part of every nuclear power plant. At certain sites, stand-alone wet storage facilities have also been built to provide additional storage capacity for the excess fuel discharged by the reactors. An autonomous wet storage facility that serves one or more reactor units is sometimes referred to by the acronym AFR meaning "Away-from-Reactor." While most countries have added to their in-plant used fuel storage capacity by building dry storage facilities, the French nuclear program has been the most notable user of AFR storage.

As its name implies, the spent fuel pool (SFP) stores the fuel irradiated in the plant's reactor in a deep pool of water. The pool is typically 40 feet deep with upright Fuel Racks positioned on its bottom slab. Under normal storage conditions, there is at least 25 feet of water cover on top of the fuel to ensure that the dose at the pool deck level is acceptably low for the plant workers. Fuel pools at most (but not all) nuclear plants are at grade level, which is desirable from the standpoint of structural capacity of the reinforced concrete structure that forms the deep pond of water. To ensure that the pool's water does not seep out through the voids and discontinuities in the pool slab or walls, fuel pools in nuclear plants built since the 1970s have always been lined with a thin single-layer stainless steel liner (typically in the range of 3/16 inch to 5/16 inch thick). The liner is made up of sheets of stainless steel (typically ASTM 240-304 or 304L) seam welded along their contiguous edges to form an impervious barrier between the pool's water and the undergirding concrete. In most cases, the welded liner seams are monitored for their integrity by locating a leak chase channel underneath them (see, e.g. FIG. 1). The leak chase channels' detection ability, however, is limited to welded regions only; the base metal area of the liner beyond the seams remains un-surveilled.

The liners have generally served reliably at most nuclear plants, but isolated cases of water seepage of pool water have been reported. Because the pool's water bears radioactive contaminants (most of it carried by the crud deposited on the fuel during its "burn" in the reactor), leaching out of the pool water to the plant's substrate, and possibly to the underground water, is evidently inimical to public health and safety. To reduce the probability of pool water reaching the ground water, the local environment and hence some AFR pools have adopted the pool-in-pool design wherein the fuel pool is enclosed by a secondary outer pool filled with clean water. In the dual-pool design, any leakage of water from the contaminated pool will occur into the outer pool, which serves as the barrier against ground water contamination. The dual pool design, however, has several unattractive aspects, viz.: (1) the structural capacity of the storage system is adversely affected by two reinforced concrete containers separated from each other except for springs and dampers that secure their spacing; (2) there is a possibility that the outer pool may leak along with the inner pool, defeating both barriers and allowing for contaminated water to reach the external environment; and (3) the dual-pool design significantly increases the cost of the storage system.

Prompted by the deficiencies in the present designs, a novel design of a spent nuclear fuel pool that would guarantee complete confinement of pool's water and monitoring of the entire liner structure including seams and base metal areas is desirable.

SUMMARY

The present invention provides an environmentally sequestered spent fuel pool system having a dual impervious liner system and leak detection/evacuation system configured to collect and identify leakage in the interstitial space formed between the liners. The internal cavity of the pool has not one but two liners layered on top of each other, each providing an independent barrier to the out-migration (emigration) of pool water. Each liner encompasses the entire extent of the water occupied space and further extends above the pool's "high water level." The top of the pool may be equipped with a thick embedment plate (preferably 2 inches thick minimum in one non-limiting embodiment) that circumscribes the perimeter of the pool cavity at its top extremity along the operating deck of the pool. Each liner may be independently welded to the top embedment plate. The top embedment plate features at least one telltale hole, which provides direct communication with the interstitial space between the two liner layers. In one implementation, a vapor extraction system comprising a vacuum pump downstream of a one-way valve is used to draw down the pressure in the inter-liner space through the telltale hole to a relatively high state of vacuum. The absolute pressure in the inter-liner space ("set pressure") preferably should be such that the pool's bulk water temperature is above the boiling temperature of water at the set pressure as further described herein.

In one embodiment, an environmentally sequestered nuclear spent fuel pool system includes: a base slab; a plurality of vertical sidewalls extending upwards from and adjoining the base slab, the sidewalls forming a perimeter; a cavity collectively defined by the sidewalls and base slab that holds pool water; a pool liner system comprising an outer liner adjacent the sidewalls, an inner liner adjacent the outer liner and wetted by the pool water, and an interstitial space formed between the liners; a top embedment plate circumscribing the perimeter of the pool at a top surface of the sidewalls adjoining the cavity; and the inner and outer sidewalls having top terminal ends sealably attached to the embedment plate.

In another embodiment, an environmentally sequestered nuclear spent fuel pool with leakage detection system includes: a base slab; a plurality of vertical sidewalls extending upwards from and adjoining the base slab, the sidewalls forming a perimeter; a cavity collectively defined by the sidewalls and base slab that holds pool water; at least one fuel storage rack disposed in the cavity that holds a nuclear spent fuel assembly containing nuclear fuel rods that heat the pool water; a pool liner system comprising an outer liner adjacent the sidewalls and base slab, an inner liner adjacent the outer liner and wetted by the pool water, and an interstitial space formed between the liners; a top embedment plate circumscribing the perimeter of the pool, the embedment plate embedded in the sidewalls adjoining the cavity; the inner and outer liners attached to the top embedment plate; a flow plenum formed along the sidewalls that is in fluid communication with the interstitial space; and a vacuum pump fluidly coupled to the flow plenum, the vacuum pump operable to evacuate the interstitial space to a negative set pressure below atmospheric pressure.

A method for detecting leakage from a nuclear spent fuel pool is provided. The method includes: providing a spent fuel pool comprising a plurality of sidewalls, a base slab, a cavity containing cooling water, and a liner system disposed in the cavity including an outer liner, an inner liner, and an interstitial space between the liner; placing a fuel storage rack in the pool; inserting at least one nuclear fuel assembly into the storage rack, the fuel assembly including a plurality of spent nuclear fuel rods; heating the cooling water in the pool to a first temperature from decay heat generated by the spent nuclear fuel rods; drawing a vacuum in the interstitial space with a vacuum pump to a negative pressure having a corresponding boiling point temperature less than the first temperature; collecting cooling water leaking from the pool through the liner system in the interstitial space; converting the leaking cooling water into vapor via boiling; and extracting the vapor from the interstitial space using the vacuum pump; wherein the presence of vapor in the interstitial space allows detection of a liner breach. The method may further include discharging the vapor extracted by the vacuum pump through a charcoal filter to remove contaminants. The method may further include: monitoring a pressure in the interstitial space; detecting a first pressure in the interstitial space prior to collecting cooling water leaking from the pool through the liner system in the interstitial space; and detecting a second pressure higher than the first pressure after collecting cooling water leaking from the pool through the liner system in the interstitial space; wherein the second pressure is associated with a cooling water leakage condition.

BRIEF DESCRIPTION OF THE DRAWINGS

The features of the exemplary embodiments will be described with reference to the following drawings where like elements are labeled similarly, and in which:

All drawings are schematic and not necessarily to scale. Parts shown and/or given a reference numerical designation in one figure may be considered to be the same parts where they appear in other figures without a numerical designation for brevity unless specifically labeled with a different part number and described herein. References herein to a figure number (e.g. FIG. 1) shall be construed to be a reference to all subpart figures in the group (e.g. FIGS. 1A, 1B, etc.) unless otherwise indicated.

DETAILED DESCRIPTION

Figure 1:
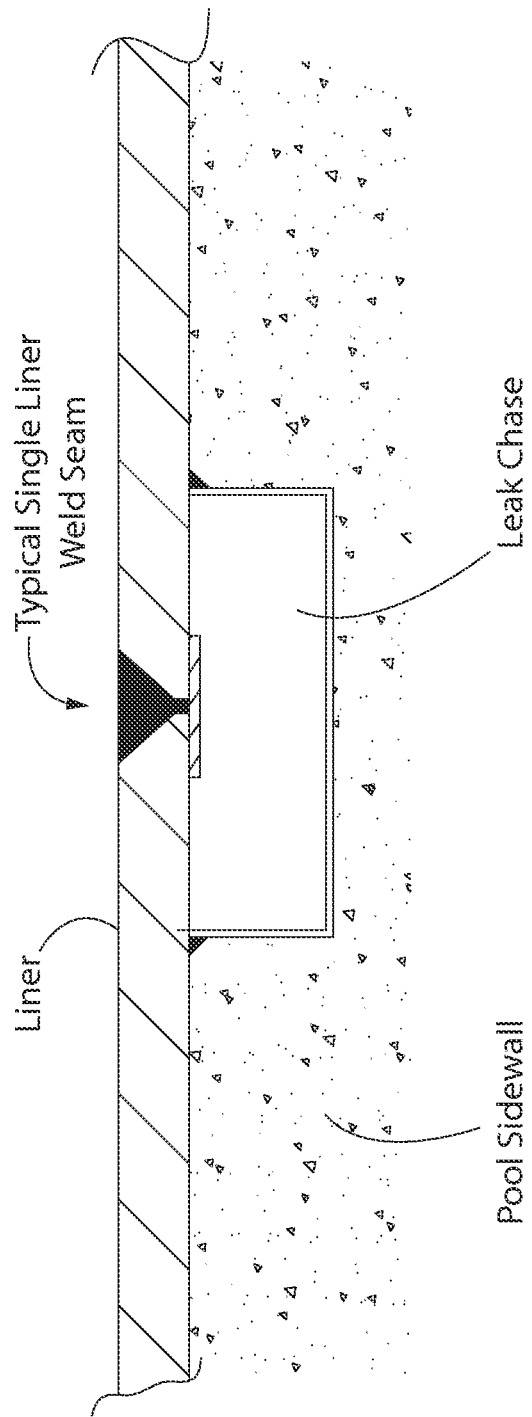
FIG. 1 is a cross sectional diagram of a known approach used to monitor the integrity of weld seams for leakage in a single spent fuel pool liner system.

The features and benefits of the invention are illustrated and described herein by reference to exemplary embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Referring to FIGS. 2-6, an environmentally sequestered spent fuel pool system includes a spent fuel pool 40 comprising a plurality of vertical sidewalls 41 rising upwards from an adjoining substantially horizontal base wall or slab 42 (recognizing that some slope may intentionally be provided in the upper surface of the bottom wall for drainage toward a low point if the pool is to be emptied and rinsed/decontaminated at some time and due to installation tolerances). The base slab 42 and sidewalls 41 may be formed of reinforced concrete in one non-limiting embodiment. The fuel pool base slab 42 may be formed in and rest on the soil sub-grade 26 the top surface of which defines grade G. In this embodiment illustrated in the present application, the sidewalls are elevated above grade. In other possible embodiments contemplated, the base slab 42 and sidewalls 41 may alternatively be buried in sub-grade 26 which surrounds the outer surfaces of the sidewalls. Either arrangement may be used and does not limit of the invention.

In one embodiment, the spent fuel pool 40 may have a rectilinear shape in top plan view. Four sidewalls 41 may be provided in which the pool has an elongated rectangular shape (in top plan view) with two longer opposing sidewalls and two shorter opposing sidewalls (e.g. end walls). Other configurations of the fuel pool 40 are possible such as square shapes, other polygonal shapes, and non-polygonal shapes.

The sidewalls 41 and base slab 42 of the spent fuel pool 40 define a cavity 43 configured to hold cooling pool water W and a plurality of submerged nuclear spent fuel assembly storage racks 27 holding fuel bundles or assemblies 28 each containing multiple individual nuclear spent fuel rods. The storage racks 27 are disposed on the base slab 42 in typical fashion. With continuing reference to FIGS. 1-6, the spent fuel pool 40 extends from an operating deck 22 surrounding the spent fuel pool 40 downwards to a sufficient depth D1 to submerge the fuel assemblies 28 (see, e.g. FIG. 6) beneath the surface level S of the pool water W for proper radiation shielding purposes. In one implementation, the fuel pool may have a depth such that at least 10 feet of water is present above the top of the fuel assembly.

Figure 2:
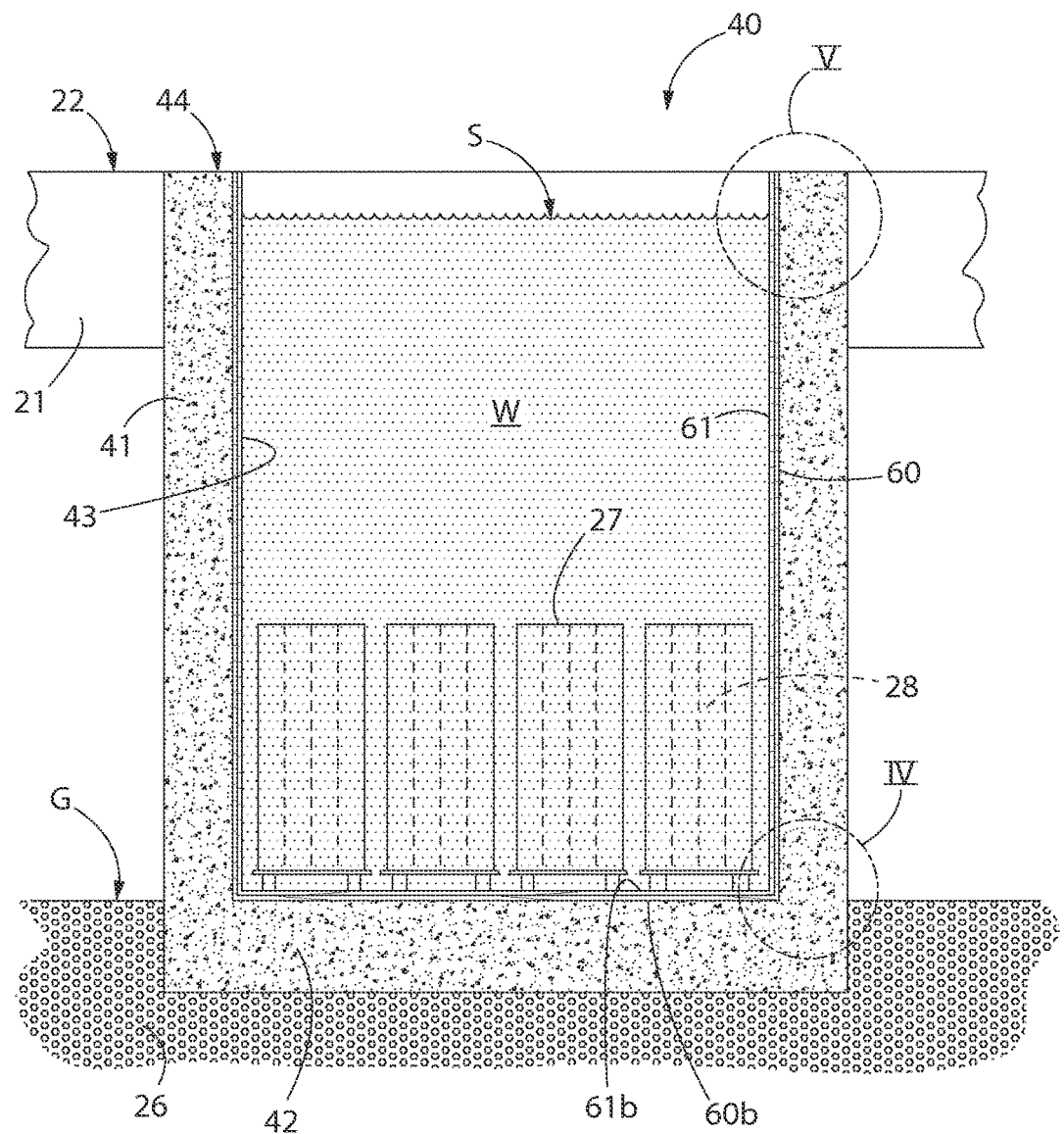
FIG. 2 is a side cross-sectional view of an environmentally sequestered nuclear spent fuel pool having a dual liner and leakage collection and monitoring system according to the present disclosure.
Figure 3:
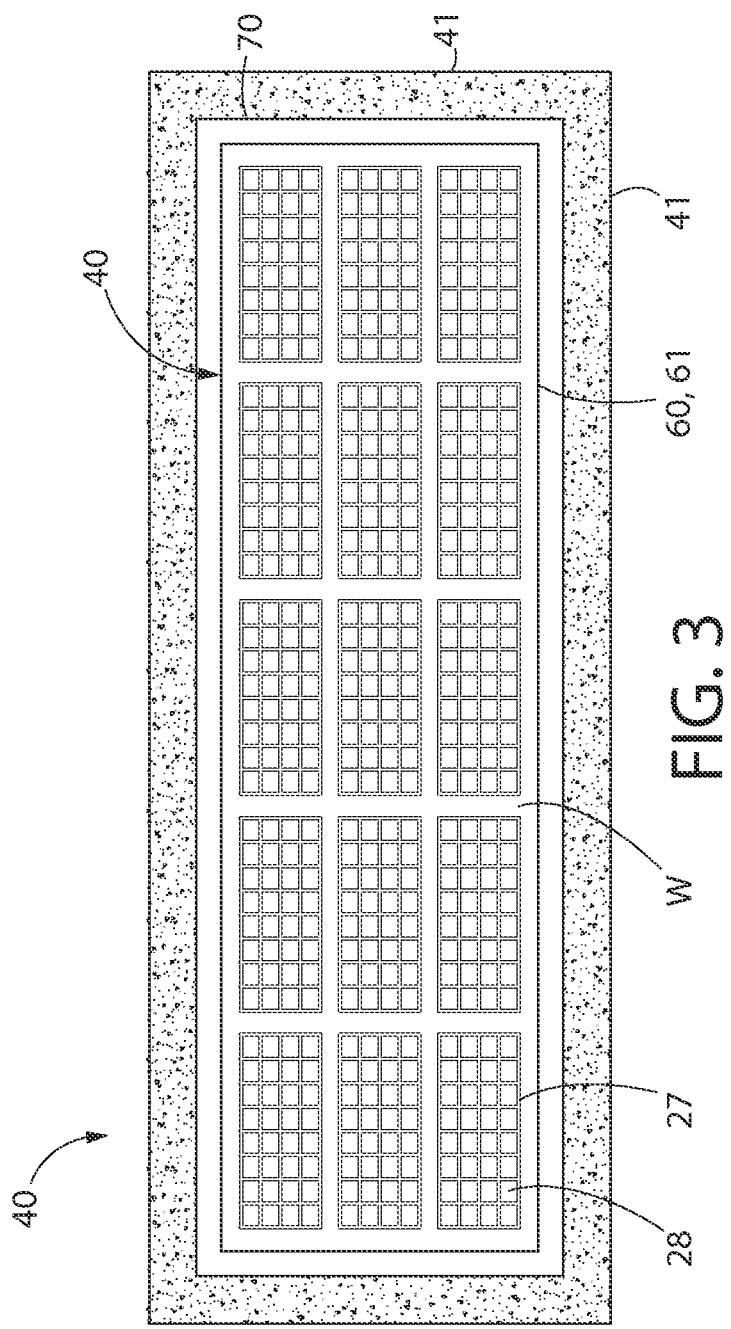
FIG. 3 is a top plan view of the fuel pool with liner and leakage collection/monitoring system of FIG. 2.
Figure 6:
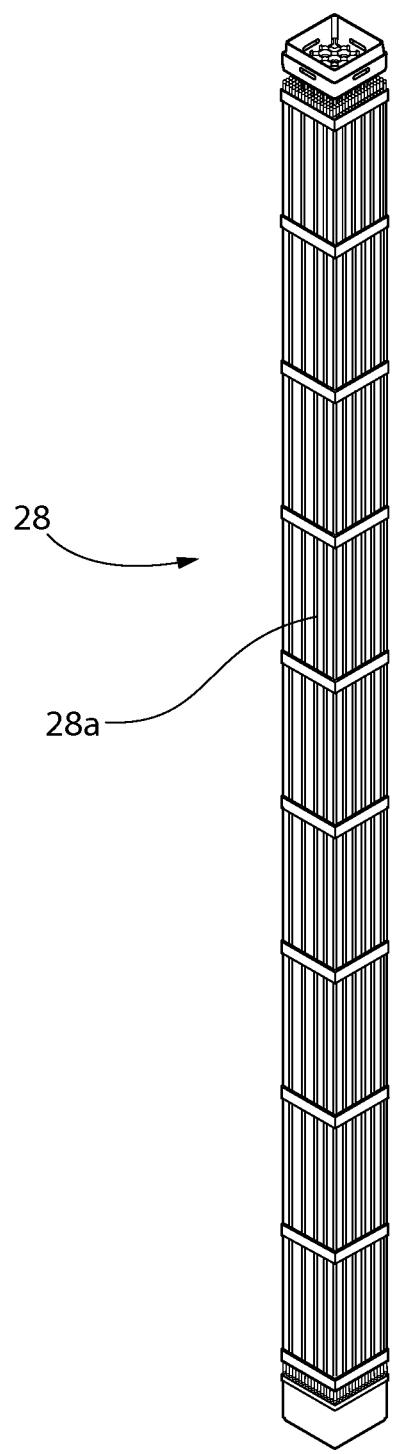
FIG. 6 is a perspective view of an example nuclear fuel assembly containing spent nuclear fuel rods.

A nuclear fuel assembly storage rack 27 is shown in FIGS. 2 and 3, and further described in commonly assigned U.S. patent application Ser. No. 14/367,705 filed Jun. 20, 1014, which is incorporated herein by reference in its entirety. The storage rack 27 contains a plurality of vertically elongated individual cells as shown each configured for holding a fuel assembly 28 comprising a plurality of individual nuclear fuel rods. An elongated fuel assembly 28 is shown in FIG. 6 holding multiple fuel rods 28a and further described in commonly assigned U.S. patent application Ser. No. 14/413,807 filed Jul. 9, 2013, which is incorporated herein by reference in its entirety. Typical fuel assemblies 28 for a pressurized water reactor (PWR) may each hold over 150 fuel rods in 10×10 to 17×17 fuel rod grid arrays per assembly. The assemblies may typically be on the order of approximately 14 feet high weighing about 1400-1500 pounds each.

The substantially horizontal operating deck 22 that circumscribes the sidewalls 41 and pool 40 on all sides in one embodiment may be formed of steel and/or reinforced concrete. The surface level of pool water W (i.e. liquid coolant) in the pool 40 may be spaced below the operating deck 22 by a sufficient amount to prevent spillage onto the deck during fuel assembly loading or unloading operations and to account to seismic event. In one non-limiting embodiment, for example, the surface of the operating deck 22 may be at least 5 feet above the maximum 100 year flood level for the site in one embodiment. The spent fuel pool 40 extending below the operating deck level may be approximately 40 feet or more deep (e.g. 42 feet in one embodiment). The fuel pool is long enough to accommodate as many spent fuel assemblies as required. In one embodiment, the fuel pool 40 may be about 60 feet wide. There is sufficient operating deck space around the pool to provide space for the work crew and for staging necessary tools and equipment for the facility's maintenance. There may be no penetrations in the spent fuel pool 40 within the bottom 30 feet of depth to prevent accidental draining of water and uncovering of the spent fuel.

According to one aspect of the invention, a spent fuel pool liner system comprising a double liner is provided to minimize the risk of pool water leakage to the environment. The liner system is further designed to accommodate cooling water leakage collection and detection/monitoring to indicate a leakage condition caused by a breach in the integrity of the liner system.

The liner system comprises a first outer liner 60 separated from a second inner liner 61 by an interstitial space 62 formed between the liners. An outside surface of liner 60 is disposed against or at least proximate to the inner surface 63 of the fuel pool sidewalls 41 and opposing inside surface is disposed proximate to the interstitial space 62 and outside surface of liner 61. The inside surface of liner 61 is contacted and wetted by the fuel pool water W. It bears noting that placement of liner 60 against liner 61 without spacers therebetween provides a natural interstitial space of sufficient width to allow the space and any pool leakage thereinto to be evacuated by a vacuum system, as further described herein. The natural surface roughness of the materials used to construct the liners and slight variations in flatness provides the needed space or gap between the liners. In other embodiments contemplated, however, metallic or non-metallic spacers may be provided which are distributed in the interstitial space 62 between the liners if desired.

The liners 60, 61 may be made of any suitable metal which is preferably resistant to corrosion, including without limitation stainless steel, aluminum, or other. In some embodiments, each liner may be comprised of multiple substantially flat metal plates which are seal welded together along their peripheral edges to form a continuous liner system encapsulating the sidewalls 41 and base slab 42 of the spent fuel pool 40.

The inner and outer liners 61, 60 may have the same or different thicknesses (measured horizontally or vertically between major opposing surfaces of the liners depending on the position of the liners). In one embodiment, the thicknesses may be the same. In some instances, however, it may be preferable that the inner liner 61 be thicker than the outer liner 60 for potential impact resistant when initially loading empty fuel storage racks 27 into the spent fuel pool 40.

Figure 4:
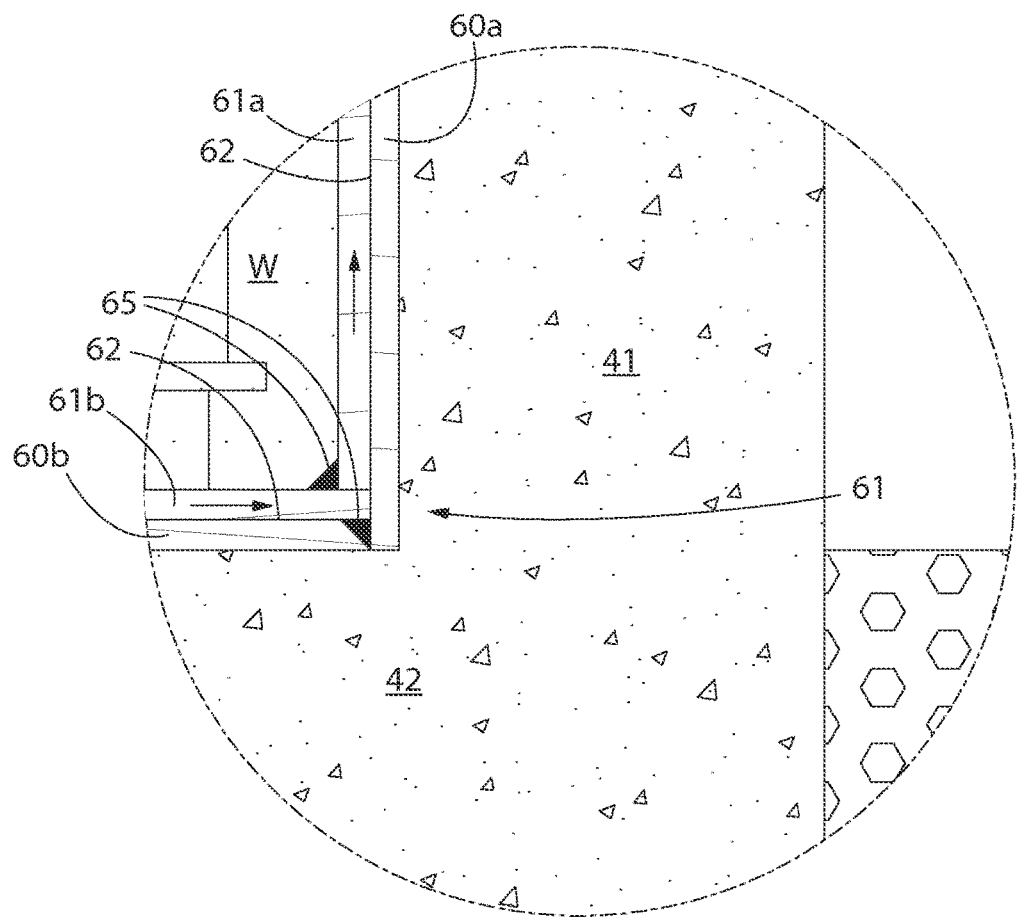
FIG. 4 is a detail taken from FIG. 2 showing a bottom joint of the liner system at the intersection of liners from the sidewalls and base slab of the fuel pool.

The outer and inner liners 60, 61 (with interstitial space therebetween) extend along the vertical sidewalls 41 of the spent fuel pool 40 and completely across the horizontal base slab 42 in one embodiment to completely cover the wetted surface area of the pool. This forms horizontal sections 60b, 61b and vertical sections 60a, 61a of the liners 60, 61 to provide an impervious barrier to out-leakage of pool water W from spent fuel pool 40. The horizontal sections of liners 60b, 61b on the base slab 42 may be joined to the vertical sections 60a, 61a along the sidewalls 41 of the pool 40 by welding. The detail in FIG. 4 shows one or many possible constructions of the bottom liner joint 64 comprising the use of seal welds 65 (e.g. illustrated fillet welds or other) to seal sections 60a to 60b along their respective terminal edges and sections 61a to 61b along their respective terminal edges as shown. Preferably, the joint 64 is configured and arranged to fluidly connect the horizontal interstitial space 64 between horizontal liner sections 60b, 61b to the vertical interstitial space 64 between vertical liner sections 60a, 61a for reasons explained elsewhere herein.

Figure 5:
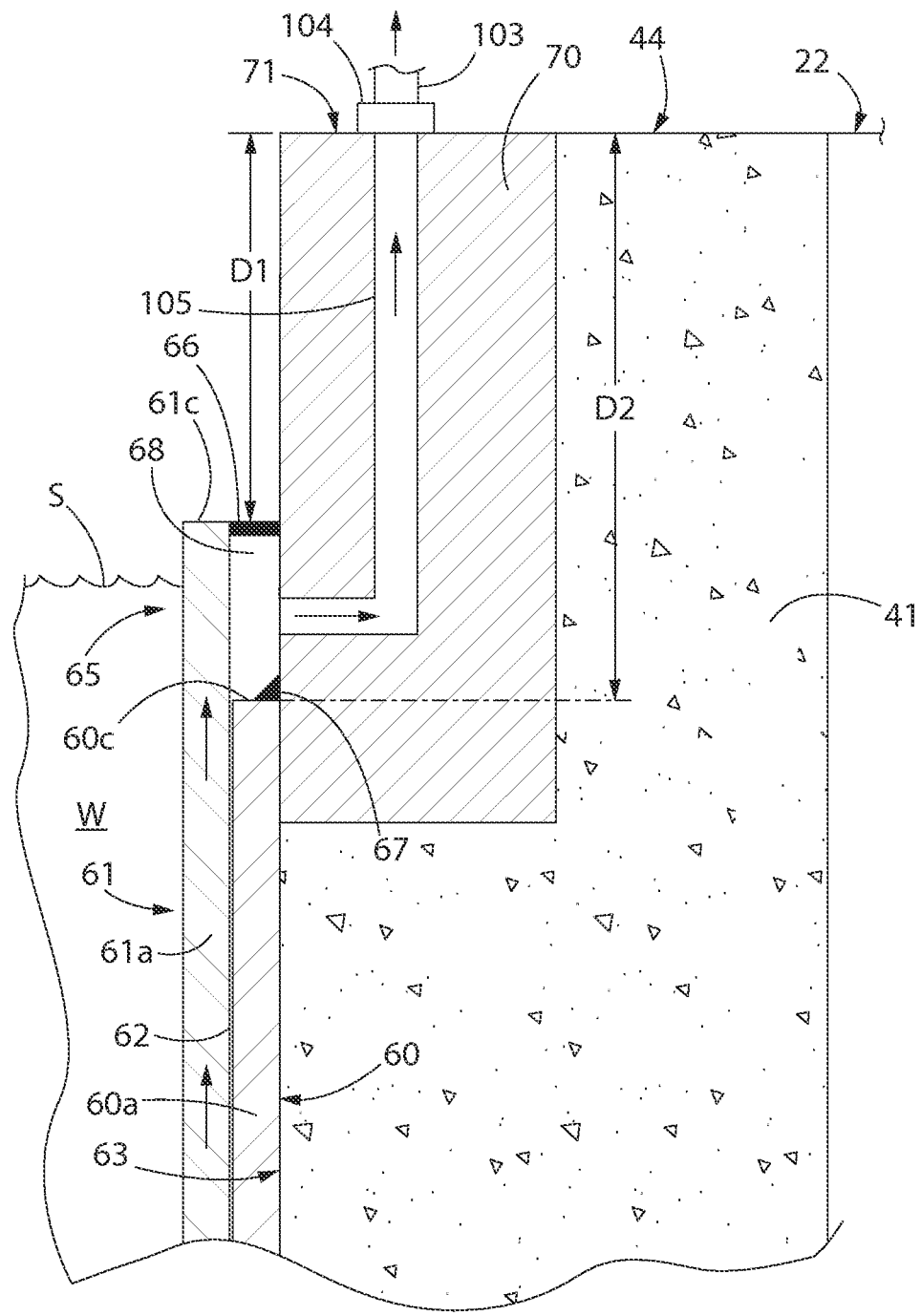
FIG. 5 is a detail taken from FIG. 2 showing a top joint of the liner system at the terminal top ends of the sidewall liners.

The top liner joint 65 in one non-limiting embodiment between the top terminal edges 60c, 61c of the vertical liner sections 60a, 61a is shown in the detail of FIG. 5. The top of the spent fuel pool 40 is equipped with a substantially thick metal embedment plate 70 which circumscribes the entire perimeter of the fuel pool. The embedment plate 70 may be continuous in one embodiment and extends horizontally along the entire inner surface 63 of the sidewalls 41 at the top portion of the sidewalls. The embedment plate 70 has an exposed portion of the inner vertical side facing the pool which extends above the top terminal ends 60c, 61c of the inner and outer liners 60, 61. The opposing outer vertical side of the plate 70 is embedded entirely into the sidewalls 41. A top surface 71 of the embedment plate 70 that faces upwards may be substantially flush with the top surface 44 of the sidewalls 41 to form a smooth transition therebetween. In other possible implementations, the top surface 71 may extend above the top surface 44 of the sidewalls. The embedment plate 70 extends horizontal outward from the fuel pool 40 for a distance into and less than the lateral width of the sidewalls 41 as shown.

The embedment plate 70 has a horizontal thickness greater than the horizontal thickness of the inner liner 61, outer liner 60, and in some embodiments both the inner and outer liners combined.

The top embedment plate 70 is embedded into the top surface 44 of the concrete sidewalls 41 has a sufficient vertical depth or height to allow the top terminal edges 60c, 61c of liners 60, 61 (i.e. sections 60a and 61a respectively) to be permanently joined to the plate. The top terminal edges of liners 60, 61 terminate at distances D2 and D1 respectively below a top surface 71 of the embedment plate 70 (which in one embodiment may be flush with the top surface of the pool sidewalls 41 as shown). Distance D1 is less than D2 such that the outer liner 60 is vertical shorter in height than the inner liner 61. In one embodiment, the embedment plate 70 has a bottom end which terminates below the top terminal edges 60i cl, 61i c l of the liners 60, 61 to facilitate for welding the liners to the plate.

In various embodiments, the embedment plate 70 may be formed of a suitable corrosion resistant metal such as stainless steel, aluminum, or another metal which preferably is compatible for welding to the metal used to construct the outer and inner pool liners 60, 61 without requiring dissimilar metal welding.

As best shown in FIG. 5, the top terminal edges 60c, 61c of inner and outer liners 60, 61 may have a vertically staggered arranged and be separately seal welded to the top embedment plate 70 independently of each other. A seal weld 66 couples the top terminal edge 61c of liner 61 to the exposed portion of the inner vertical side of the embedment plate 70. A second seal weld 67 couples the top terminal edge 60c of liner 60 also to the exposed portion of the inner vertical side of the embedment plate 70 at a location below and spaced vertical apart from seal weld 66. This defines a completely and hermetically sealed enclosed flow plenum 68 that horizontal circumscribes the entire perimeter of the spent fuel pool 40 in one embodiment. The flow plenum 68 is in fluid communication with the interstitial space 62 as shown. One vertical side of the flow plenum is bounded by a portion of inner liner 61 and the opposing vertical side of the plenum is bounded by the inner vertical side of the top embedment plate 70.

The top flow plenum 68 may be continuous or discontinuous in some embodiments. Where discontinuous, it is preferable that a flow passageway 105 in the top embedment plate 70 be provided for each section of the separate passageways.

Seal welds 66 and 67 may be any type of suitable weld needed to seal the liners 60, 61 to the top embedment plate 70. Backer plates, bars, or other similar welding accessories may be used to make the welds as needed depending on the configuration and dimensions of the welds used. The invention is not limited by the type of weld.

In one embodiment, the outer and inner liners 60, 61 are sealably attached to the spent fuel pool 40 only at top embedment plate 70. The remaining portions of the liners below the embedment plate may be in abutting contact with the sidewalls 41 and base slab 42 without means for fixing the liners to these portions.

It bears noting that at least the inner liner 61 has a height which preferably is higher than the anticipated highest water level (surface S) of the pool water W in one embodiment. If the water level happens to exceed that for some reason, the top embedment plate 70 will be wetted directly by the pool water and contain the fluid to prevent overflowing the pool onto the operating deck 22.

Figure 7:
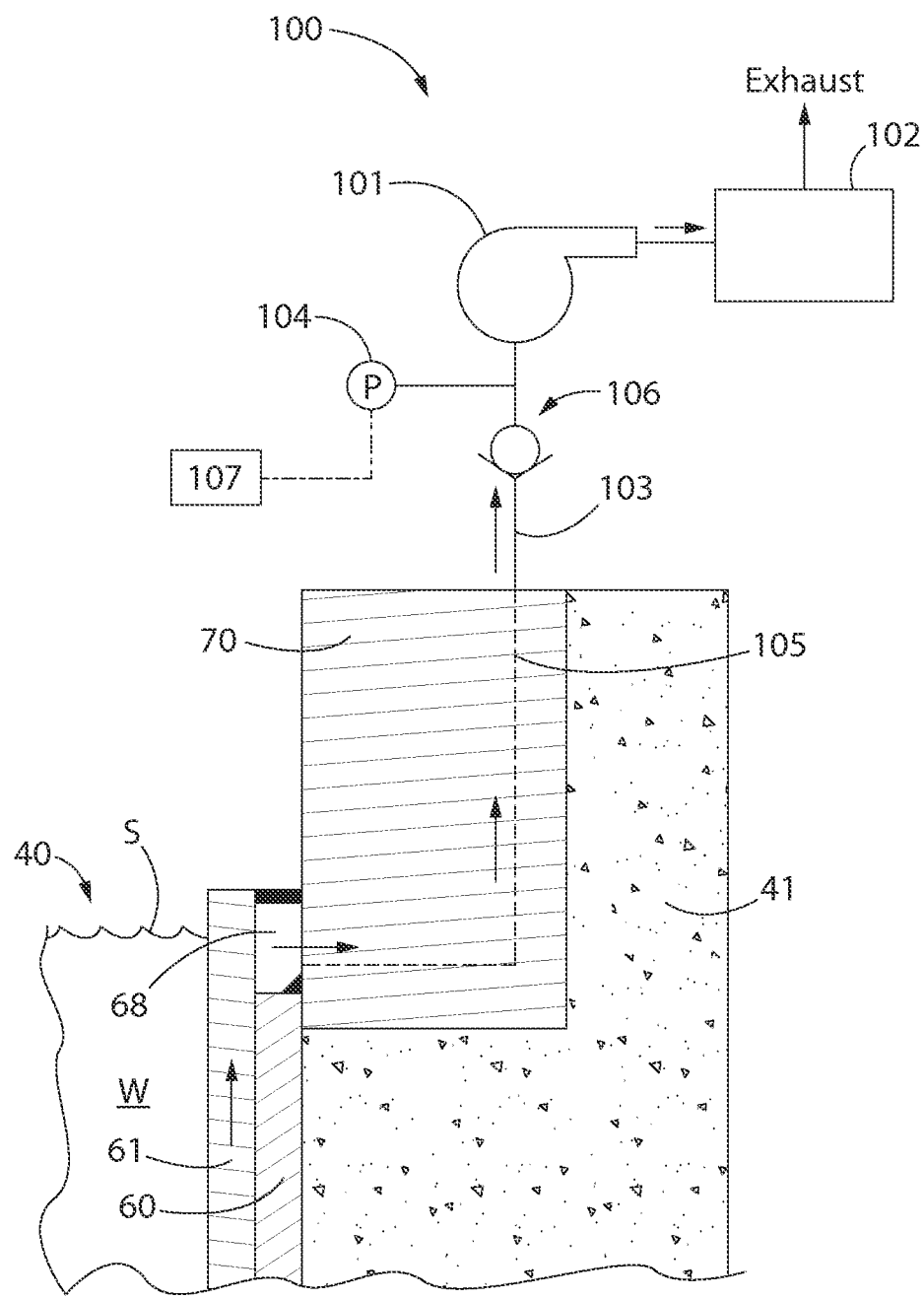
FIG. 7 is a schematic diagram of a vacuum leakage collection and monitoring system according to the present disclosure.

According to another aspect of the invention, a vapor extraction or vacuum system 100 is provided that is used to draw down the air pressure in the interstitial space between the outer and inner liners 60, 61 to a relatively high state of vacuum for leakage control and/or detection. FIG. 7 is a schematic diagram of one embodiment of a vacuum system 100.

Referring to FIGS. 5 and 7, vacuum system 100 generally includes a vacuum pump 101 and a charcoal filter 102. Vacuum pump 101 may be any suitable commercially-available electric-driven vacuum pump capable of creating a vacuum or negative pressure within the interstitial space 62 between the pool liners 60 and 61. The vacuum pump 101 is fluidly connected to the interstitial space 68 via a suitable flow conduit 103 which is fluidly coupled to a telltale or flow passageway 105 extending from the top surface 71 of the top embedment plate 70 to the top flow plenum 68 formed between the pool liners 60 and 61. Flow conduit 103 may be formed of any suitable metallic or non-metallic tubing or piping capable of withstanding a vacuum. A suitably-configured fluid coupling 104 may be provided and sealed to the outlet end of the flow passageway 105 for connecting the flow conduit 103. The inlet end of the flow passageway penetrates the inner vertical side of top embedment plate 70 within the flow plenum 68. The flow passageway 105 and external flow conduit 103 provides a contiguous flow conduit that fluidly couples the flow plenum 68 to the vacuum pump 101. A one-way check valve is disposed between the flow plenum 105 and the suction inlet of the vacuum pump 101 to permit air and/or vapor to flow in a single direction from the liner system to the pump.

The absolute pressure maintained by the vacuum system 100 in the interstitial space 62 between the liners 60, 61 (i.e. "set pressure") preferably should be such that the bulk water temperature of the spent fuel pool 40 which is heated by waste decay heat generated from the fuel rods/assemblies is above the boiling temperature of water at the set pressure. The table below provides the boiling temperature of water at the level of vacuum in inches of mercury (Hg) which represent some examples of set pressures that may be used. .

| Pressure in inch, HgA | Boiling Temp, deg F. |
| --- | --- |
| 1 | 79 |
| 2 | 101 |
| 3 | 115 |
| 4 | 125 |
| 5 | 133 |

Any significant rise in pressure would indicate potential leakage of water in the interstitial space 62 between the liners 60, 61. Because of sub-atmospheric conditions maintained by the vacuum pump 101 in the interstitial space, any water that may leak from the pool into this space through the inner liner 61 would evaporate, causing the pressure to rise which may be monitored and detected by a pressure sensor 104. The vacuum pump 101 preferably should be set to run and drive down the pressure in the interstitial space 62 to the "set pressure."

In operation as one non-limiting example, if the vacuum pump 101 is operated to create a negative pressure (vacuum) in the interstitial space 62 of 2 inches of Hg, the corresponding boiling point of water at that negative pressure is 101 degrees Fahrenheit (degrees F.) from the above Table. If the bulk water temperature of pool water W in the spent fuel pool 40 were at any temperature above 101 degrees F. and leakage occurred through the inner pool liner 61 into the interstitial space 62, the liquid leakage would immediately evaporate therein creating steam or vapor. The vacuum pump 101 withdraws the vapor through the flow plenum 68, flow passageway 105 in the top embedment plate 70, and flow conduit 103 (see, e.g. directional flow arrows of the water vapor in FIGS. 5 and 7). Pressure sensor 104 disposed on the suction side of the pump 101 would detect a corresponding rise in pressure indicative of a potential leak in the liner system. In some embodiments, the pressure sensor 104 may be operably linked to a control panel of a properly configured computer processor based plant monitoring system 107 which monitors and detects the pressure measured in the interstitial space 62 between the liners on a continuous or intermittent basis to alert operators of a potential pool leakage condition. Such plant monitoring systems are well known in the art without further elaboration.

The extracted vapor in the exhaust or discharge from the vacuum pump 101 is routed through a suitable filtration device 102 such as a charcoal filter or other type of filter media before discharge to the atmosphere, thereby preventing release of any particulate contaminants to the environment.

Advantageously, it bears noting that if leakage is detected from the spent fuel pool 40 via the vacuum system 100, the second outer liner 60 encapsulating the fuel pool provides a secondary barrier and line of defense to prevent direct leaking of pool water W into the environment.

It bears noting that there is no limit to the number of vapor extraction systems including a telltale passageway, vacuum pump, and filter combination with leakage monitoring/detection capabilities that may be provided. In some instances, four independent systems may provide adequate redundancy. In addition, it is also recognized that a third or even fourth layer of liner may be added to increase the number of barriers against leakage of pool water to the environment. A third layer in some instances may be used as a palliative measure if the leak tightness of the first inter-liner space could not, for whatever reason, be demonstrated by a high fidelity examination in the field such as helium spectroscopy.

While the foregoing description and drawings represent exemplary embodiments of the present disclosure, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made within the scope of the present disclosure. One skilled in the art will further appreciate that the embodiments may be used with many modifications of structure, arrangement, proportions, sizes, materials, and components and otherwise, used in the practice of the disclosure, which are particularly adapted to specific environments and operative requirements without departing from the principles described herein. The presently disclosed embodiments are therefore to be considered in all respects as illustrative and not restrictive. The appended claims should be construed broadly, to include other variants and embodiments of the disclosure, which may be made by those skilled in the art without departing from the scope and range of equivalents.

What is claimed is:

1. An environmentally sequestered nuclear spent fuel pool system comprising:
   a base slab;
   a plurality of vertical sidewalls extending upwards from and adjoining the base slab, the sidewalls comprising an inner surface and a top surface;
   a cavity that holds pool water defined by the inner surface of the sidewalls and the base slab, the cavity having an open top end;
   a pool liner system comprising an outer liner having an outer surface adjacent to the inner surface of the sidewalls and an inner surface that faces the cavity, an inner liner having an outer surface adjacent to the inner surface of the outer liner and an inner surface that faces the cavity and is wetted by the pool water, and an interstitial space formed between the outer surface of the inner liner and the inner surface of the outer liner, the interstitial space forming an air gap between the inner and outer liners that extends uninterrupted from the inner surface of the outer liner to the outer surface of the inner liner, each of the inner and outer liners terminating at a top terminal end;
   a top embedment plate circumscribing the cavity at a top surface of the sidewalls and adjoining the cavity without closing the open top end of the cavity, the top embedment plate comprising an inner vertical side facing the cavity and an opposite outer vertical side embedded within the sidewalls;
   wherein the top terminal end of the inner liner is sealably attached to the inner vertical side of the top embedment plate at a first seal location and the top terminal end of the outer liner is sealably attached to the inner vertical side of the top embedment plate at a second seal location such that a hermetically sealed top flow plenum is formed between the first and second seal locations; and
   wherein the top flow plenum is in fluid communication with the interstitial space.

2. The spent fuel pool system according to claim 1, wherein a horizontal portion of the inner and outer liners extend across and covers the base slab between opposing sidewalls, the horizontal portions of the inner and outer liners and portions covering the sidewalls forming a continuous barrier encapsulating the pool water.

3. The spent fuel pool system according to claim 1, wherein one vertical side of the top flow plenum is bounded by a portion of the outer surface of the inner liner and an opposing vertical side of the top flow plenum is bounded by a portion of the inner vertical side of the top embedment plate.

4. The spent fuel pool system according to claim 1, wherein the top flow plenum extends around an entire perimeter of the spent fuel pool.

5. The spent fuel pool system according to claim 1, further comprising a flow passageway formed through the top embedment plate that is in fluid communication with the top flow plenum, the flow passageway having an outlet end penetrating a top surface of the top embedment plate.

6. The spent fuel pool system according to claim 1, wherein the top embedment plate has a horizontal thickness greater than a thickness of the inner and outer liners combined.

7. The spent fuel pool system according to claim 1, wherein the top terminal ends of the inner and outer liners are welded separately and directly to the top embedment plate.

8. The spent fuel pool system according to claim 1, wherein the inner liner, the outer liner, and the top embedment plate are made of the same metallic material.

9. The spent fuel pool system according to claim 1, further comprising at least one fuel storage rack disposed on the base slab, the storage rack having a plurality of cells each configured for holding a spent nuclear fuel assembly containing nuclear fuel rods.

10. The spent fuel pool system according to claim 1 wherein the outer surface of the inner liner and the inner surface of the outer liner are both exposed directly to the air gap.

11. The spent fuel pool system according to claim 1 wherein the outer vertical side of the top embedment plate is directly adjacent to a recessed portion of the inner surface of the sidewalls.

12. The spent fuel pool system according to claim 11 wherein a top surface of the embedment plate is substantially flush with the top surface of the sidewalls.

13. The spent fuel pool system according to claim 1 wherein a height of the inner liner measured from a top surface of the base slab to the top terminal end of the inner liner is greater than a height of the outer liner measured from the top surface of the base slab to the top terminal end of the outer liner.

14. A nuclear spent fuel pool system comprising:
   a base slab having a top surface;
   a plurality of vertical sidewalls extending upwards from the top surface of the base slab, each of the sidewalls having an inner surface and an outer surface opposite the inner surface;
   a cavity that holds pool water collectively defined by the inner surfaces of the sidewalls and the top surface of the base slab;
   a pool liner system comprising:
      an outer liner having a first surface disposed against the inner surface of the sidewalls and an opposite second surface that faces the cavity; and
      an inner liner having a first surface facing the second surface of the outer liner and an opposite second surface that faces the cavity and is wetted by the pool water, wherein the first surface of the inner liner is spaced apart from the second surface of the outer liner thereby forming an interstitial space between the inner and outer liners;
   an embedment plate embedded into the sidewalls and having a top surface; and
   the inner liner terminating at a top terminal edge that is spaced a first distance from the top surface of the embedment plate and the outer liner terminating at a top terminal edge that is spaced a second distance from the top surface of the embedment plate, the second distance being greater than the first distance;
   a first seal weld coupling the top terminal edge of the inner liner to the embedment plate; a second seal weld coupling the top terminal edge of the outer liner to the embedment plate; and
   a flow plenum defined between the first and second seal welds and between the embedment plate and a portion of the inner liner that protrudes above the top terminal end of the outer liner.

15. The spent fuel pool system according to claim 14 wherein the embedment plate extends from a bottom surface to the top surface, and wherein the bottom surface of the embedment plate is located between the top terminal edges of the inner and outer liners and the top surface of the base slab, each of the inner and outer liners coupled to the embedment plate along a vertical surface of the embedment plate that faces the cavity and extends between the top and bottom surfaces of the embedment plate.

16. The spent fuel pool system according to claim 14 wherein the top surface of the embedment plate is substantially flush with a top surface of the sidewalls, and wherein the embedment plate comprises a first surface facing the cavity and an opposite second surface, and wherein the first surface of the embedment plate is substantially flush with the inner surfaces of the sidewalls.

17. The spent fuel pool system according to claim 14 wherein the interstitial space forms an air gap that extends uninterrupted between the first surface of the inner liner and the second surface of the outer liner.

18. An environmentally sequestered nuclear spent fuel pool system comprising:
   a base slab;
   at least one sidewall extending upwards from the base slab, the sidewall having an inner surface;
   a cavity defined by the inner surface of the sidewall and the base slab, the cavity filled with pool water and having an open top end;
   a pool liner system comprising an outer liner having an inner surface and an outer surface and an inner liner having an inner surface and an outer surface, the outer surfaces of each of the inner and outer liners facing the inner surface of the sidewall and the inner surfaces of each of the inner and outer liners facing away from the inner surface of the sidewall, the outer liner being positioned between the inner liner and the sidewall so that the outer surface of the inner liner faces the inner surface of the outer liner, each of the inner and outer liners being located in the cavity such that the inner surface of the inner liner is wetted by the pool water;
   the outer surface of the inner liner spaced apart from the inner surface of the outer liner to form an air gap between the inner and outer liners;
   and a top embedment plate coupled to the sidewall along a top end of the sidewall, the top embedment plate comprising an inner vertical side facing the cavity, each of the inner and outer liners sealed to the inner vertical side of the top embedment plate at or near top terminal ends of the inner and outer liners; and
   a portion of the inner liner extending beyond the top terminal end of the outer liner so that a top flow plenum is formed between the outer surface of the portion of the inner liner and the inner vertical side of the top embedment plate; wherein the top flow plenum is in fluid communication with the air gap between the inner and outer liners; and wherein the top embedment plate comprises a passageway that is in fluid communication with the top flow plenum and an ambient environment.

* * * * *